United States Patent
Courtright et al.

(10) Patent No.: US 9,102,287 B1
(45) Date of Patent: Aug. 11, 2015

(54) PICKUP TRUCK CARGO BOX E-COAT TROUGH

(71) Applicant: FORD GLOBAL TECHNOLOGIES, LLC, Dearborn, MI (US)

(72) Inventors: Mark Joseph Courtright, Allen Park, MI (US); Vincent Chimento, Plymouth, MI (US); Eric MacDonald, Windsor (CA); Elizabeth Theeck, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/314,666

(22) Filed: Jun. 25, 2014

(51) Int. Cl.
*B60R 13/07* (2006.01)
*B62D 33/02* (2006.01)
*B62D 29/00* (2006.01)

(52) U.S. Cl.
CPC .............. *B60R 13/07* (2013.01); *B62D 29/008* (2013.01); *B62D 33/02* (2013.01)

(58) Field of Classification Search
CPC .... B62D 21/17; B62D 25/2054; B62D 33/02; B62D 29/008; B62D 25/087; B60R 13/07
USPC ................. 296/183.1, 184.1, 193.07, 193.08, 296/203.04, 204, 208
See application file for complete search history.

(56) References Cited

U.S. PATENT DOCUMENTS

| | | | | |
|---|---|---|---|---|
| 5,188,418 A * | 2/1993 | Walworth et al. | ........... | 296/184.1 |
| 5,673,956 A * | 10/1997 | Emery | ........... | 296/39.2 |
| 5,938,272 A * | 8/1999 | Jurica et al. | ............... | 296/184.1 |
| 6,128,815 A * | 10/2000 | Jurica et al. | .................... | 29/417 |
| 6,582,012 B1 * | 6/2003 | Smith | .......................... | 296/208 |
| 6,814,397 B2 * | 11/2004 | Henderson et al. | ........ | 296/184.1 |
| 7,322,640 B2 * | 1/2008 | Ni et al. | ........................ | 296/204 |
| 7,665,800 B2 * | 2/2010 | Werner | ...................... | 296/184.1 |
| 7,673,930 B2 | 3/2010 | Stratman | | |
| 7,731,271 B2 * | 6/2010 | Shelbo et al. | ............. | 296/183.1 |
| 7,823,958 B2 * | 11/2010 | Sato | .......................... | 296/183.1 |
| 8,020,924 B2 | 9/2011 | Niezur et al. | | |
| 2005/0242620 A1 * | 11/2005 | McNulty et al. | ........... | 296/183.1 |
| 2008/0277969 A1 * | 11/2008 | Sato | ......................... | 296/193.08 |
| 2011/0031778 A1 * | 2/2011 | Edwards et al. | ........... | 296/183.1 |

FOREIGN PATENT DOCUMENTS

WO    2012152897 A2    11/2012

* cited by examiner

*Primary Examiner* — Gregory Blankenship
(74) *Attorney, Agent, or Firm* — Raymond L. Coppiellie; Brooks Kushman P.C.

(57) ABSTRACT

A pickup truck including a cargo box having a truck bed and a rear sill adjacent the rear of the truck bed. The sill attaches beneath the truck bed. The sill includes a drain trough on its upper surface facing the underside of the truck bed. The drain trough includes a groove extending along the length of the sill. A plurality of apertures is formed in the sill within the groove. The apertures are formed toward an inner surface of a side panel of the sill. The drain trough irrigates liquid (e.g., e-coating paint) that resides between the truck bed and the sill to collect in the groove and exit the groove via the apertures, enabling the liquid to drain down the inner surface instead of an exterior visible surface of the sill.

17 Claims, 3 Drawing Sheets

PICKUP TRUCK CARGO BOX E-COAT TROUGH

TECHNICAL FIELD

The present disclosure relates to a drain trough in a rear sill of a pickup truck.

BACKGROUND

Pickup trucks are motor vehicles with a rear open top cargo area that is often referred to as a cargo box having a bed. Pickup trucks are popular largely because the bed allows the vehicle to be utilized in many different ways, including carrying a variety of types of cargo and towing various types of trailers. Traditionally, the majority of body structures on pickup trucks have been formed from steel alloys. Through years of experience, pickup truck designers have learned how to design steel truck body parts that withstand the variety of demanding pickup truck applications. The current regulatory and economic environment have increased the importance of making pickup trucks more fuel efficient while maintaining or improving functionality and durability. One way to reduce the fuel consumption of a vehicle, especially when unloaded, is to reduce vehicle structure weight.

Aluminum alloys typically have a higher strength to weight ratio than steel alloys. Consequently, replacing steel with aluminum offers the potential for weight reduction. However, the elastic modulus of aluminum is generally lower than the elastic modulus of steel. Additionally, fabrication techniques and methods of joining parts that work well for steel parts may not work well for the same aluminum part. Due to these and other differences, simple material substitution does not necessarily produce an acceptable design.

Aluminum alloys are generally identified by a four-digit number, the first digit of which typically identifies the major alloying element. When describing a series of aluminum alloys based on the major alloying element, the first number may be followed by three x's (upper or lower case) or three zeros. For example, the major alloying element in 6xxx (or 6000) series aluminum alloy is magnesium and silicon, while the major alloying element of 5xxx series is magnesium and for 7xxx series is zinc. Additional numbers represented by the letter 'x' (or zeros) in the series designation define the exact aluminum alloy. For example, a 6061 aluminum alloy has a composition of 0.4-0.8% Silicon, 0-0.7% Iron, 0.15-0.4% Copper, 0-0.15% Manganese, 0.8-1.2% Magnesium, 0.04-0.35% Chromium, 0-0.25% Zinc, and 0-0.15% Titanium. Different alloys provide different trade-offs of strength, hardness, workability, and other properties.

In addition, five basic temper designations may be used for aluminum alloys which are: F—as fabricated, O—annealed, H—strain hardened, T—thermally treated, and W—as quenched (between solution heat treatment and artificial or natural aging). The temper designation may be followed by a single or double digit number for further delineation. For example, aluminum with a T6 temper designation has been solution heat treated and artificially aged, but not cold worked after the solution heat treatment (or such that cold working would not be recognizable in the material properties).

SUMMARY

According to one embodiment, a vehicle comprises an aluminum pickup truck box having a rear end and an underside. A sill is mechanically coupled to the pickup truck box. The sill has an upper surface facing the underside and adjacent the rear end of the truck box. The sill includes a drain trough formed in the upper surface.

According to another embodiment, a rear sill for a pickup truck comprises a generally vertical side portion and an upper portion extending generally horizontally from the side portion. The upper portion has an upper surface configured to underlie and face an underside of a cargo bed of the pickup truck. The upper surface of the upper portion defines a drain trough extending at least partially therethrough.

According to yet another embodiment, a sill and truck bed assembly for a pickup truck comprises a substantially horizontal bed panel and a sill. The bed panel has an underside and a rear surface extending generally transverse from the bed panel. The sill has a substantially vertical side portion and an upper portion extending transversely from the side portion. The upper portion is coupled to the underside of the bed panel to substantially align the side portion to the rear surface of the bed panel. The upper portion has an upper surface defining a groove beneath the underside to drain e-coating fluid away from an outer surface of the side portion.

In any of the above embodiments, the drain trough may include a groove, cut, or slot along the length of the sill, extending along the width of the truck bed. A plurality of holes or apertures is cut at spaced apart locations in the groove. The groove and the holes in the drain trough aid in directing drained water away from the outside visible surface of the side portion of the sill. The holes may be cut in locations at least partially directly above a rear surface of the side portion of the sill, such that liquid can be irrigated through the drain trough, out the holes and down the rear surface of the sill.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
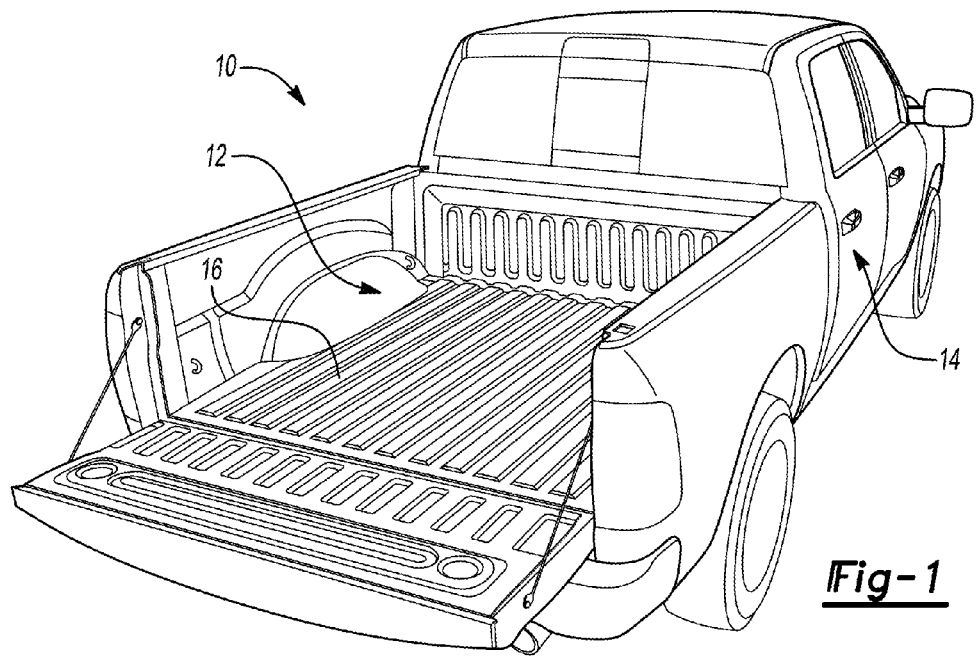
FIG. 1 is a perspective view of a pickup truck having a truck box and truck bed according to one embodiment of the present disclosure.

FIG. 1 illustrates a pickup truck 10 having many structural elements made of aluminum. The pickup truck 10 includes a pickup truck cargo box 12 that is rearward of a passenger compartment 14 of the truck. The cargo box 12 includes a truck bed 16 with an open and exposed top, although other embodiments exist in which the truck bed is covered from above. A tailgate 18 is hinged at its bottom to provide access to the upper surface of the truck bed 16. When opened, the tailgate 18 and the upper surface of the truck bed 16 can be coplanar to provide a flat load surface.

Many of the components of the pickup truck 10 can be made of aluminum. The truck's cargo box 12 and bed 16 are no exception, and may be made of 6000-series aluminum. If such a material choice is made for the truck bed 16, additional reinforcement structures may be provided to aid in the strength and rigidity of the truck bed 16. These reinforcement structures can also be made of 6000-series aluminum. Particular configurations of these reinforcement structures provide the aluminum truck 10 with strength comparable to typical trucks that are made mostly of steel.

Figure 2:
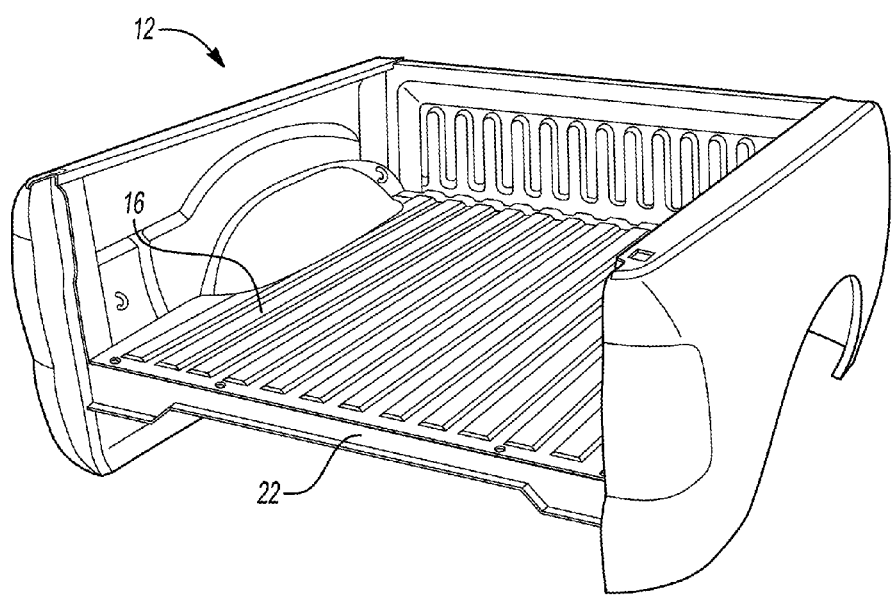
FIG. 2 is a perspective view of a cargo box of the pickup truck, including a truck bed mounted adjacent to a rear sill.

Once the aluminum cargo box 12 (shown in isolation in FIG. 2) is formed, it may be subjected to an e-coating process for application of paint. During the e-coating paint process, the cargo box 12 is dipped into a vat of fluid paint that is supplied with an electric charge. The electric voltage applied to the paint causes the colloidal particles in the paint to migrate, condense, and adhere onto the cargo box 12. This process allows all surfaces (top, bottom, sides, etc.) of the cargo box 12 to be covered with a strongly-adhered layer of paint. Other e-coating processes are contemplated within the scope of the present disclosure; for example, the cargo box 12 (rather than the liquid) can be supplied with the electric charge.

Once the paint is applied, the cargo box 12 can then be lifted and removed from the vat of paint. After the cargo box 12 exits the paint vat, excess paint can be removed and allowed to drip back into the vat, recycling the paint for subsequent application. The cargo box 12 then enters a high temperature bake oven to cure the paint. However, any small amount of liquid fluid residue trapped on the cargo box 12 can quickly heat up and boil, causing significant drips.

For example, referring to FIGS. 2-6, the cargo box 12 includes a rear sill 22 that connects to the bottom of the truck bed 16. In particular, the rear sill 22 is generally "U"-shaped and includes an upper portion or member 24 disposed generally horizontal relative to the truck bed that intersects with a side portion or member 25 that extends generally vertical. The upper member 24 includes an upper surface 26 adapted to couple or mate to the underside of the truck bed in a face-to-face relationship, and an opposing lower surface 27. The coupling can be by welding, riveting, bolting, or other such fashions to directly or indirectly connect the sill to the truck bed. The side member 25 includes an outer surface 28 toward the rear of the truck that can be visible from the rear of the truck. An opposing inner surface 29 faces toward the front of the truck.

The upper surface 26 of the sill 22 may be generally planar and flat, while the truck bed 16 may include several undulations or grooves that aid in the rigidity of the truck bed 16. During the e-coating process, once the cargo box 12 is removed from the vat of paint, residue of liquid paint may collect and drip between the underside of the truck bed 16 and the upper surface 26 of the sill 22, or in other areas. Left uncontrolled, this collected paint may force its way and drip down visible surfaces of the cargo box 12, such as the outer surface 28 of the sill 22, leaving unsightly drip marks that eventually harden and cure.

As will be described below with reference to FIGS. 4-6, the sill 22 is formed with drainage (e.g., drain trough 30) in order to facilitate the irrigation and removal of the paint residue from visible surfaces of the cargo box 12, according to various embodiments of the present disclosure.

Figure 4:
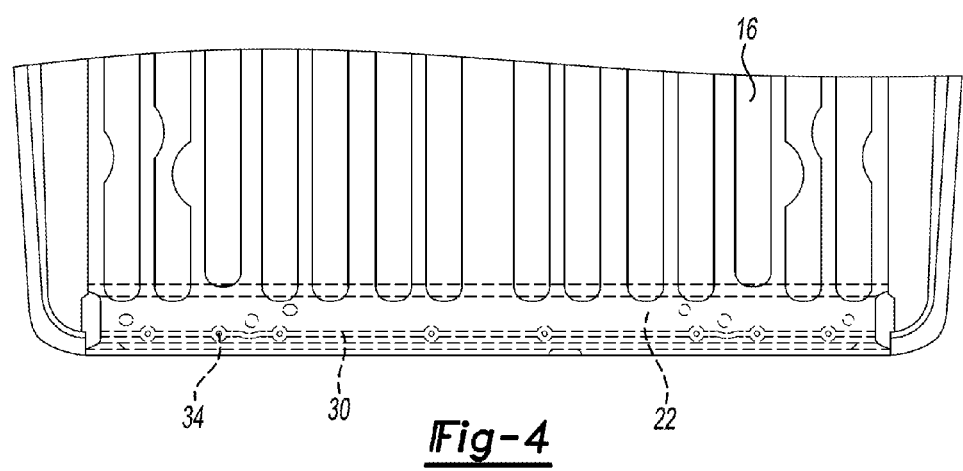
FIG. 4 is a top view of the rear of the cargo box, illustrating the truck bed above the sill.
Figure 5:
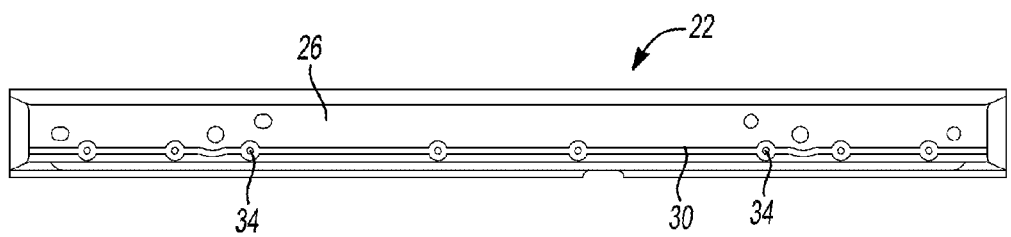
FIG. 5 is a top view of the sill in isolation.

FIG. 4 shows a top view of the rear of the truck bed 16 with the sill 22 attached to the rear and/or underside of the truck bed 16. As best seen in FIG. 5, in which the upper surface 26 of the sill 22 is illustrated in isolation, the sill 22 is formed to include a drain trough 30 in the upper surface 26 of the sill 22. The drain trough 30 extends along the length of the sill 22, and in some embodiments extends the entire length of the sill 22. The drain trough 30 may include a groove that extends at least partially through the upper member 24 and toward the lower surface 27. When assembled, the drain trough 30 is directly beneath the truck bed 16 with the upper member 24 in a face-to-face relationship with the lower surface of the truck bed 16. Similarly, the outer surface 28 of the side member 25 is generally coplanar with an end surface of the truck bed 16 such that a smooth surface is provided therebetween. As the cargo box 12 is lifted and removed from paint vat, the excess paint can collect in the drain trough 30 beneath the truck bed 16.

Figure 3:
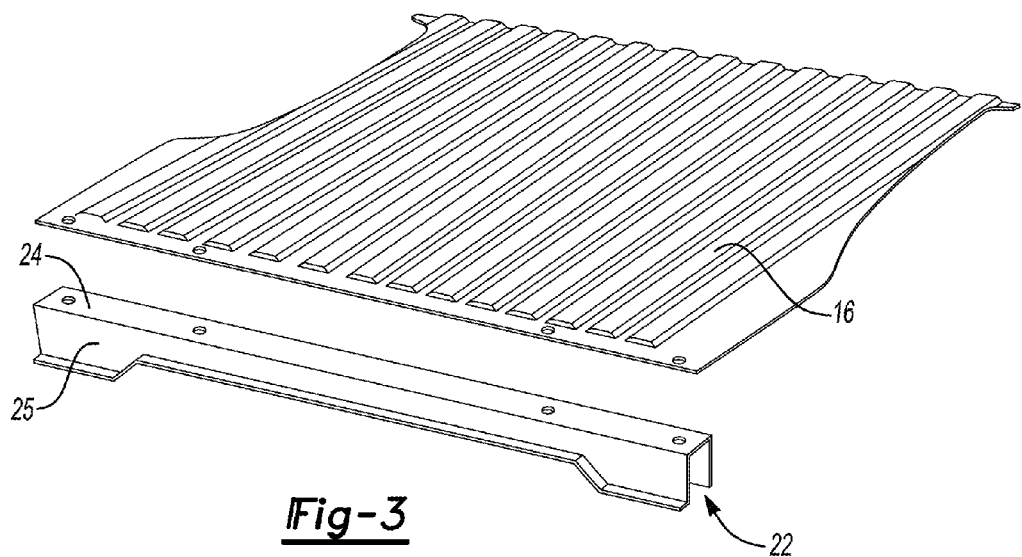
FIG. 3 is a partial exploded perspective view of a sill and bed assembly, showing the truck bed and the sill in isolation.

The drain trough 30 also includes one or more drain holes 34. The drain holes 34 may be apertures punched, cut, or otherwise formed in the sill 22 at spaced apart locations along the drain trough 30. As seen in FIG. 3, the groove of the drain trough 30 may widen at locations where the drain holes 34 are located. As the liquid paint collects in the drain trough 30, the drain holes 34 enable the liquid paint to drip down the interior surface 29 (rather than the visible exterior surface 28) of the sill 22. Thus, any collected liquid paint is directed to gather and drip on surfaces of the cargo box 12 that are not visible to a person standing behind the pickup truck 10.

Figure 6:
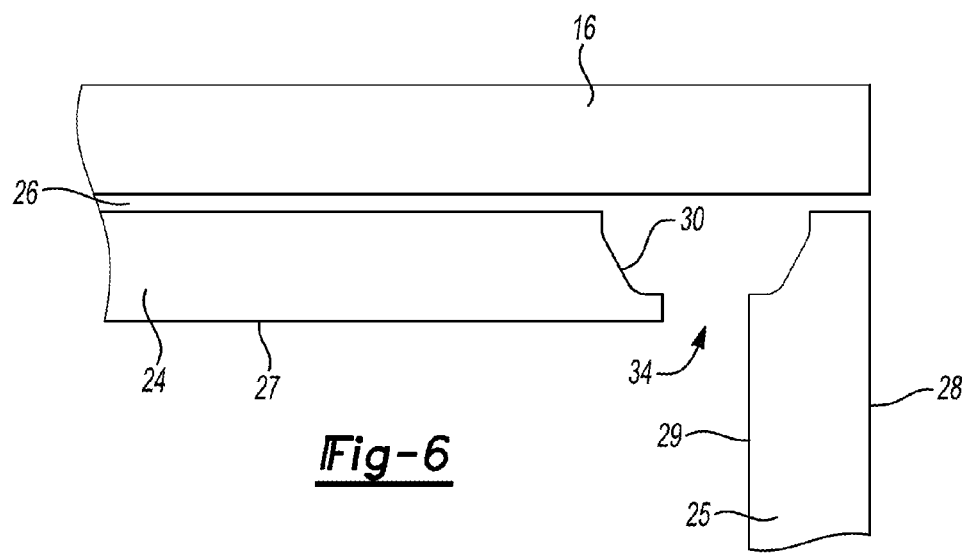
FIG. 6 is a cross-sectional view of the truck bed above the sill taken along a drainage aperture in a groove formed on the sill.

FIG. 6 shows a cross-sectional view of the sill 22 beneath the truck bed 16, through one of the drain holes 34 in the drain trough 30. It should be understood that although a space is illustrated between the truck bed 16 and the upper surface 26, this space is magnified for illustrative purposes to highlight the flow path of paint trapped between the truck bed 16 and the sill 22 after removal from the e-coating paint vat. The trough 30 may be located in a rear region of the upper surface 26, closer to the side member 25 than the front of the sill 22. As shown, the trapped paint is able to collect in the trough 30 and travel to one or more of the drain holes 34. The drain holes 34 can be located generally offset (e.g., toward the front of the truck) from a location directly above the side member 25. This allows the paint to drip down the interior surface 29 of the side member 25 of the sill 22, while inhibiting the paint from dripping down the visible exterior surface 28 of the side member 25. As the paint is heated and cured, drip marks may only be present along the interior-facing surfaces of the sill and/or truck bed, along areas not visible to a person standing behind the pickup truck 10.

While embodiments described above are directed to a pickup truck, it should be understood that the structural features of the present disclosure can be utilized with other vehicles, for example sports utility vehicles (SUVs), vans, etc. Similarly, while a truck cargo box is described herein, it should be understood that embodiments of the present disclosure can also be applied to a flat-bed pickup truck in which no cargo box may be present.

It should also be understood that terms such as "horizontal" and "vertical" are intended to be relative to a ground surface of a fully assembled vehicle. For example, the side member is vertical relative to the ground when the sill is mounted to the truck bed. Of course, prior to assembly to the pickup truck, the terms "horizontal" and "vertical" can take different relative meanings.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
an aluminum pickup truck box having a rear end and an underside;
a sill mechanically coupled to the pickup truck box, the sill having an upper surface facing the underside adjacent the rear end, the sill including a drain trough formed in the upper surface, wherein the sill defines one or more apertures in the drain trough.

2. The vehicle of claim 1, wherein the drain trough is a groove formed in the upper surface of the sill extending partially toward a lower surface.

3. The vehicle of claim 1, wherein the one or more apertures are a plurality of drain holes spaced apart within the drain trough, wherein the drain trough and the drain holes are configured to facilitate drainage of liquid into the drain trough, through the drain holes and along an inner surface of the sill.

4. The vehicle of claim 3, wherein the drain trough and the drain holes are further configured to inhibit drainage of liquid along an outer rear surface of the sill.

5. The vehicle of claim 1, wherein the sill defines a length and the drain trough extends along the length.

6. The vehicle of claim 1, wherein rear end of the truck box includes a rear surface, and the sill includes a rear surface generally coplanar with the rear surface of the truck box.

7. A rear sill for a pickup truck comprising:
a generally vertical side portion; and
an upper portion extending generally horizontally from the side portion, the upper portion having an upper surface configured to underlie an underside of a cargo bed of the pickup truck;
wherein the upper surface of the upper portion defines a drain trough extending at least partially therethrough, and wherein the drain trough extends along a length of the rear sill.

8. The rear sill of claim 7, wherein the drain trough includes a groove extending from the upper surface of the upper portion and partially toward a lower surface of the upper portion.

9. The rear sill of claim 7, wherein the drain trough includes a plurality of spaced apart apertures extending through the upper portion.

10. The rear sill of claim 9, wherein the drain trough and the apertures are configured to facilitate drainage of liquid along an inner surface of the side portion while inhibiting drainage of liquid along an outer rear surface of the side portion.

11. The rear sill of claim 9, wherein the apertures are located offset from a location above the side portion.

12. The rear sill of claim 7, wherein the upper portion includes a rear region and a front region further from the side portion than the rear region, and wherein the drain trough is located in the rear region.

13. The rear sill of claim 7, wherein the drain trough is offset from the side portion.

14. A sill and bed assembly for a pickup truck comprising:
a substantially horizontal bed panel having an underside and a rear surface extending generally transverse from the bed panel; and
a sill having a substantially vertical side portion and an upper portion extending transversely therefrom, wherein the upper portion is coupled to the underside of the bed panel to substantially align the side portion to the rear surface of the bed panel, and wherein the upper portion has an upper surface defining a groove beneath the underside to drain e-coating fluid away from an outer surface of the side portion.

15. The sill and bed assembly of claim 14, wherein the sill includes a plurality of apertures formed along a bottom surface of the groove that extend entirely through the upper portion.

16. The sill and bed assembly of claim 15, wherein the side portion of the sill includes inner surface, wherein at least a portion of some of the apertures are aligned with the inner surface of the sill to facilitate drainage of liquid along the inner surface.

17. The sill and bed assembly of claim 15, wherein the underside of the bed and the upper portion define a space therebetween at a location spaced from the groove, wherein the groove and the apertures are adapted to irrigate liquid within the space to flow along an inner surface of the side portion.

* * * * *